UNITED STATES PATENT OFFICE.

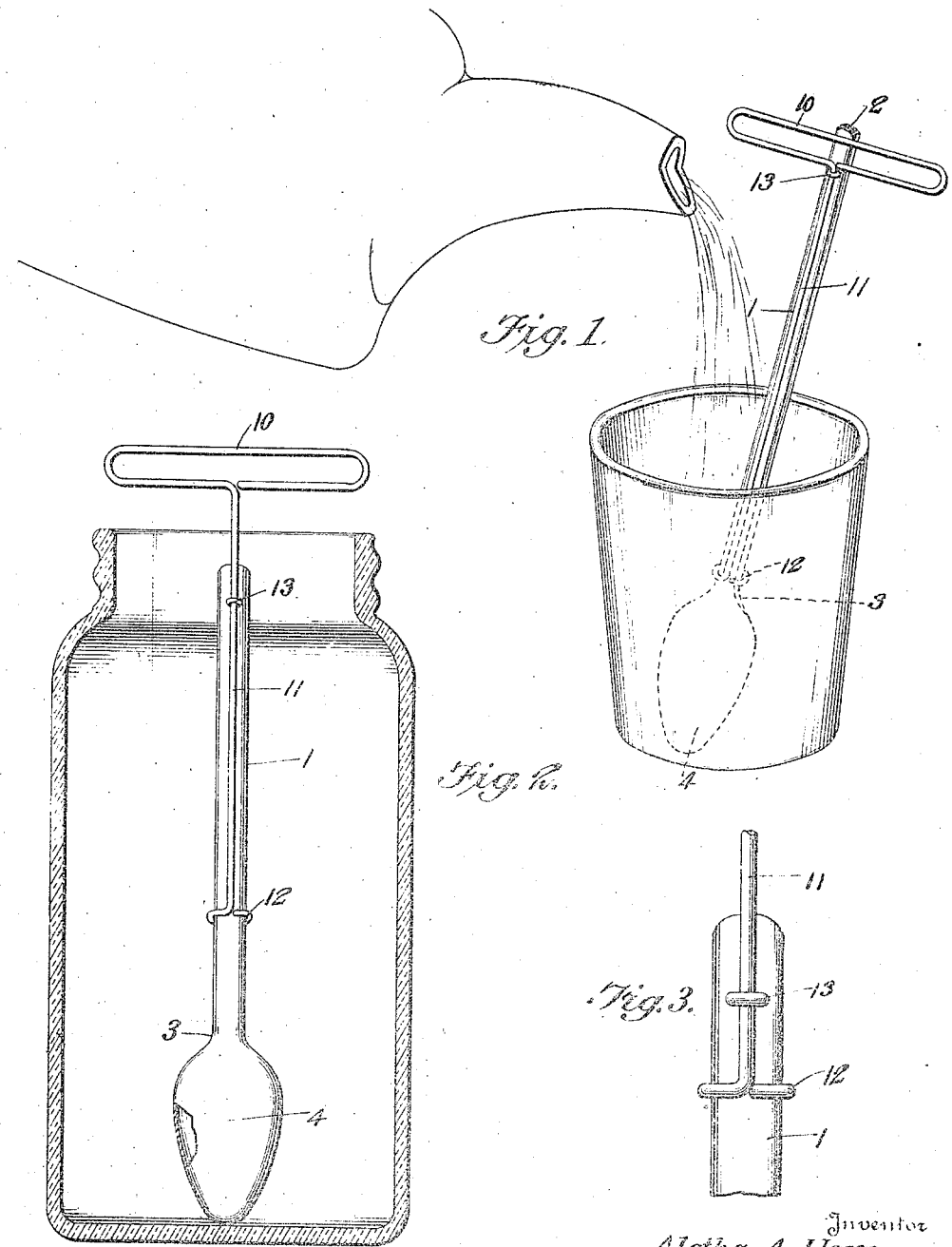

ALETHA A. HOESE, OF HARTINGTON, NEBRASKA.

GLASS-PROTECTOR.

1,238,669.   Specification of Letters Patent.   Patented Aug. 28, 1917.

Application filed December 20, 1916. Serial No. 138,076.

*To all whom it may concern:*

Be it known that I, ALETHA A. HOESE, a citizen of the United States, residing at Hartington, in the county of Cedar and State of Nebraska, have invented new and useful Improvements in Glass-Protectors, of which the following is a specification.

This invention relates to kitchen and table articles, and is more nearly allied to jar lifters, although it is in effect an instrument for protecting fruit jars, jelly glasses, tumblers, and other glass articles from breakage when very hot water or other liquid is put into them. Incidentally it is provided with means for protecting the hands of the operator from contact with the instrument or tool after the latter has been heated by the boiling liquid. Also it has other features of advantage and construction, all of which are set forth in the following specification and are shown in the drawings herewith, wherein—

Figure 1 is a perspective view of this tool in use in a tumbler, showing the same about to be filled with hot water from a teakettle.

Fig. 2 is a section view through a fruit jar, showing my improved protector therein and its lifter slightly distended, or rather moved upward part way along its handle or stem.

Fig. 3 is a detail showing one form of telescopic connection between the stem and lifter.

This article is an implement or tool made of metal and in two members, whereof one is the protector proper and the other is the lifter having a handle by which the protector may be removed without the use of a holder and without danger of burning the operator's hand.

The protector comprises a stem with an enlarged integral head at its lower end. Said stem 1 is tubular as seen by the opening 2 in its upper end in Fig. 3, and it may well be a metal pipe or tube, preferably slightly flattened, and about six inches long. At its lower end it is united integrally at the point 3 with a hollow, imperforate head 4, which latter may be given a variety of shapes and should be somewhat larger than the stem although not too large for insertion in the mouth of a comparatively small-sized fruit jar or large-sized bottle. By preference its head is ovoid in side elevation so as to somewhat resemble the bowl of a spoon, or rather two bowls with cupped bodies united around their edges; and in edge elevation it is elliptical, as two such bowls would appear when so united. However, I do not wish to be limited to the specific shape of the head.

The second member is a lifter, so called because it is used by the housewife in lifting the protector when the latter is hot. This element may be made of wire or the like, and preferably it has a laterally elongated handle 10 at its upper end standing at right angles to a long straight shank 11 which latter is provided with a loop 12 at its lower end loosely embracing the stem of the protector and slidably mounted thereon. An eye 13 in the stem near its upper end loosely embraces the shank, and thus the two elements are telescopically connected as will be clear. When the handle is grasped by the operator and raised, the loop slides upward on the stem and the shank slides upward through the eye until the neck of the loop comes in contact with the eye, when the parts can be no longer telescoped, and further lifting of the handle causes the lifting of the entire implement. The handle may take any desired form, but I preferably make it oblong along a line at right angles to the length of the shank, so that the operator may pass her fingers through it or may use this handle for hanging the implement on a hook or the like.

It is well known to housewives that when boiling water or other liquid is poured into a delicate glass receptacle, such as a tumbler or fruit jar, the same is liable to be fractured by its sudden expansion; and that in order to prevent such breaking, a metal implement such as a spoon is placed in the jar before the water is poured into it—the theory being that this implement takes up some of the heat from the water. Whether this theory be true or not, the fact remains that this expedient often saves the breaking of the glass by protecting it in some way from sudden expansion. I have found that when washing dishes or when preserving, the fingers are often burnt in the act of removing a hot spoon too soon from the glass or jar thus protected; also on occasions I have used too short a spoon to protect a fruit jar, with the result that the water rose above the tip of the spoon and both had to be poured out of the jar before I could use the latter for preserves and the like. This instrument or implement is designed for the same purpose as far as the protection of the glass is concerned, and its lifter is intended for the use of the housewife. When it is constructed as above described, the user takes it from the hook on which it has been suspended and drops its lower end or head into the mouth of the jar or places it within the tumbler as seen in Fig. 1, permitting the lifter to slide down on the same as far as it will. By this latter statement I mean that the handle on the upper end of the lifter is too wide to drop into the mouth of an ordinary fruit jar, and too long to fall into a glass if the latter were extremely deep. Hot water is then poured into the glass as suggested above, and it will be found that the same is not broken. The user now removes the implement by grasping the handle and drawing it upward, and as this handle is not integrally connected with the stem and head it has not been heated to so high a degree. In raising the handle the lifter slides telescopically on the stem, but when the shank of the loop comes up against the eye it can slide no farther and the entire implement is removed. The enlargement of the head is for the purpose of giving more surface within the glass to take up the heat from the water, and its shape is a matter of design or preference, although it should have no corners or sharp angles and should not be too large to enter the mouth of a small-sized tumbler. I preferably make the stem tubular and connect it at its lower end with the interior of the head and leave a vent or opening 2 at its upper head, so that the air within this device suddenly expanded by the heat may escape. I preferably flatten the stem laterally and elongate the loop to fit it, so that the entire device may be used as a stirrer as when cooking preserves in a deep kettle over a hot fire; and when it is given this use it will be found that the wire element or the lifter does not attain the same degree of heat as the lower portion or protector proper, because they are not integrally united. I do not wish to be limited, however, to the precise details of construction nor to the metal employed or the proportion of parts.

What is claimed as new is:

1. A glass protector for use as herein described, the same comprising a stem having an integral enlarged head at its lower end, a lifter composed of separate material and including a laterally elongated handle at its upper end and a shank at its lower end, the shank having a loop at its lower extremity slidably inclosing such stem, and an eye at the upper end of the stem slidably inclosing such shank.

2. A glass protector for the purpose described, the same comprising a tubular metallic stem open at its upper end and having a hollow, imperforate head at its lower end communicating with its bore, and a lifter consisting of another piece of metal movably mounted on said stem.

3. In a glass protector for the purpose set forth, the combination with a metal stem and a head integrally united with its lower end; of a shank connected with said stem and composed of another piece of metal, and a loop-shaped handle at the upper end of the stem with its longest axis transverse to the length of said shank, and longer than the width of the mouth of the ordinary glass.

In testimony whereof I affix my signature.

ALETHA A. HOESE.